(12) United States Patent
Godfrey (10) Patent No.: US 6,768,742 B1
(45) Date of Patent: Jul. 27, 2004

(54) ON-CHIP LOCAL AREA NETWORK

(75) Inventor: Gary Michael Godfrey, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/415,758

(22) Filed: Oct. 8, 1999

(51) Int. Cl.[7] .............................................. H04L 12/28
(52) U.S. Cl. ........................ 370/400; 370/908; 709/250
(58) Field of Search ............................... 370/400–408, 370/908–911; 709/223, 230, 232, 249, 250

(56) References Cited

U.S. PATENT DOCUMENTS

| | | | | |
|---|---|---|---|---|
| 5,151,897 A | * | 9/1992 | Suzuki ........................ 370/401 |
| 5,603,049 A | | 2/1997 | Balmer | |
| 5,640,399 A | * | 6/1997 | Rostoker et al. ............. 370/392 |
| 5,764,895 A | * | 6/1998 | Chung ......................... 709/250 |
| 5,908,468 A | * | 6/1999 | Hartmann .................... 710/316 |
| 6,061,739 A | * | 5/2000 | Reed et al. ................... 709/245 |
| 6,247,161 B1 | * | 6/2001 | Lambrecht et al. ............. 716/1 |
| 6,275,975 B1 | * | 8/2001 | Lambrecht et al. ........... 716/14 |
| 6,373,841 B1 | * | 4/2002 | Goh et al. .................... 370/389 |

OTHER PUBLICATIONS

Newton, Harry. "Newton's Telecom Dictionary". Feb. 2002. Eighteenth Edition. Pp. 153, 420.*

* cited by examiner

*Primary Examiner*—Hassan Kizou
*Assistant Examiner*—Timothy Lee
(74) *Attorney, Agent, or Firm*—Meyertons Hood Kivlin Kowert & Goetzel, P.C.; Jeffrey C. Hood (57) ABSTRACT

A computer chip having on-chip internetworked modules and implementing a network protocol for on-chip and, also preferably, off-chip data transfers. The modules on chip are interconnected through a plurality of on-chip packet-switched local area networks or LANs. The familiar Internet topology may be implemented on-chip with each module being treated as a "host." A plurality of network interconnect (e.g. routers, gateways, etc.) may also be provided to interconnect the plurality of LANs. The computer chip implements a network protocol for on-chip data transfer. The network protocol may be TCP/IP. In that case, the computer chip itself may be treated as an Internet. This flexible chip architecture in that the computer chip may have modules clustered conveniently according to functionality, and the various modules may interact with one another without overburdening the chip packing density. An addressing scheme based on a modified TCP/IP protocol and involving an internetworked-chip module address (ICMA) is disclosed. Intermodule and internetwork data communication on the chip may be easily accomplished using internetworked-chip module addresses.

19 Claims, 5 Drawing Sheets

ON-CHIP LOCAL AREA NETWORK

BACKGROUND OF THE INVENTION

1. Field of the Invention

The present invention relates to semiconductor computer chips, and more particularly, to a computer chip having on-chip internetworked modules and implementing all or a portion of a local area network for on-chip or off-chip data transfers.

2. Description of the Related Art

Computer systems have traditionally comprised a system unit or housing which comprises a plurality of electrical components comprising the computer system. A computer system typically includes a motherboard, which is configured to hold the microprocessor and memory, and one or more buses used in the computer system. The motherboard typically comprises a plurality of computer chips or electrical components including intelligent peripheral devices, bus controllers, processors, bus bridges etc.

More recently, computer systems are evolving toward an integration of functions into a handful of computer chips. This coincides with the ability of chipmakers to place an increasingly large number of transistors on a single chip. For example, currently, chip manufacturers are able to place up to ten million transistors on a single integrated circuit or monolithic substrate. It is anticipated that within several years chipmakers will be able to place one billion transistors on a single chip. Thus, computer systems are evolving toward comprising a handful of computer chips, where each computer chip comprises a plurality of functions. The integration of a plurality of modules or functions on a single computer chip and the need for maximized throughput requires a new approach to on-chip data transfer.

Modern integrated circuits may include numerous functional units on-chip, e.g., a memory, a processor, an I/O controller, a task-specific hybrid, a task-general hybrid etc. During on-chip data transfer, one or more of these functional units may be accessed more frequently than other remaining functional units. A simple, point-to-point, dedicated communication between any two of the functional units may not always suffice. To cope with the uncertainties of module usage and varying module cluster designs, a scheme to accomplish on-chip data transfer with reduced inter-module physical connections is desired.

SUMMARY OF THE INVENTION

The computer chip according to one aspect of the present invention includes one or more modules interconnected through a plurality of on-chip packet-switched local area networks or LANs. These LANs may be organized in an Ethernet, a Token-Ring, a FDDI (Fiber Distributed Data Interface) or any other serial or parallel network configuration. The familiar Internet topology may be implemented on-chip with each module being treated as a "host." One or more network interconnects may be provided to interconnect the plurality of local area networks. Each module may be assigned, preferably during chip fabrication, an internetworked-chip module address or ICMA. This ICMA may be analogized to the conventional IP address assigned to a host in the Internet.

The computer chip implements a network protocol for on-chip and, preferably, off-chip data transfers. The computer chip may use one of a plurality of network addressing schemes to identify numerous modules on the chip. The network address may be a traditional IP address or the given ICMA, for example. The computer chip, hence, may itself be treated as an Internet. This chip configuration functions as a local on-chip internet, and may additionally include conventional internet elements such as DNS servers, WINS servers, backbones etc. This methodology allows flexible chip architecture in that the computer chip may have modules clustered conveniently according to, for example, functionality and the various modules may interact with one another without overburdening the chip packing density.

Each module in the computer chip is configured to convert a data block into one or more data packets or convert a plurality of data blocks into a single packet, and then send each data packet to one or more of the other modules in the internetworked-chip using a network protocol, for example, the TCP/IP protocol. One or more modules may operate as a "DNS server" and have a built-in ICMA dictionary for the modules on the chip, or each LAN may be configured to handle ICMA configuration during data transfer between two or more modules. In one embodiment, an ICMA may include a plurality of network identifier bits to identify the data packet originating or destination network. The ICMA may further include a plurality of module identifier bits to identify the specific module in a network that is originating or receiving the given data packet. The data path from one module to the other one may include a number of routers, and may not have the same path for each such data transmission from one module to the other. The routers may be configured to handle data packet traffic using principles of packet-switched communication, thus expediting data flow and reducing latency or backlog in the internetworked-chip.

In another embodiment, the internetworked computer chip may be a portion of a LAN extending off-chip as well as on-chip. A network interconnect may be configured to detect any misdirected or improperly addressed data communication between the parts of the LAN, and then, may facilitate the proper communication through corrected ICMAs. The network interconnect may be coupled to an external LAN segment to facilitate a data communication between the computer chip of the present invention and another similar chip or device on the LAN. The network interconnect may have its own ICMA. When more than one such internetworked chips are included in the computer system, then each port controller may have a different ICMA, although different modules in different such internetworked chips may have same ICMAs. The network interconnect, additionally, may implement a dynamic network addressing protocol, e.g., (DHCP) to allow automatic allocation of an ICMA for a module. This allows added flexibility when upgrading specific modules in the computer chip, or when the chip is transported to a different computer system environment.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF THE PREFERRED EMBODIMENT

The present invention relates to a computer chip having on-chip internetworked modules and implementing an Internet-based protocol, preferably including a modified TCP/IP protocol, for on-chip data transfer. A uniform numbering scheme is adopted for this disclosure; description of one embodiment and/or figure may be used to further understand the workings and usage of other embodiments and/or figures when necessary.

Figure 1A:
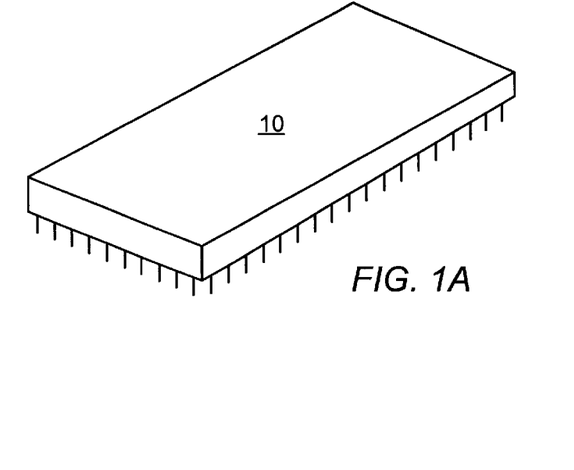
FIG. 1A illustrates an embodiment of a computer chip comprising internetworked on-chip modules, which are part of a local area network.

FIG. 1A—Computer Chip

Referring now to FIG. 1A, a computer chip 10 is shown from a side view. Computer chip 10 preferably comprises a monolithic silicon substrate comprising a plurality of transistors. The computer chip 10 may also use gallium arsenide (GaAs) or another suitable semiconductor material. Although shown as a ceramic socket mount pin grid array (PGA) package, the computer chip 10 may be packaged in any of various ways, including as a surface mount, socket mount, or insertion/socket mount. Materials used in the packaging of the computer chip 10 may include ceramic packages, leadless chip carrier packages (LCC), glass-sealed packages, or plastic packages. The actual type of chip package for the computer chip 10 may include ceramic quad flatpack (CQFP), PGA, ceramic dual-in-line package (C-DIP), LCC socket or surface mount, ceramic quadpack (CERQUAD), small outline package gull wing (SOP), small outline package J-lead (SOJ), thin small outline package (TSOP) etc. The computer chip 10 may have any of the various types of connectivity including pin grid array (PGA), ball grid array (BGA), direct chip attach (DCA), metal bands or pins etc. Also usable is the controlled collapse chip connection (C4) method, commonly known as the "flip chip" method.

Figure 1B:
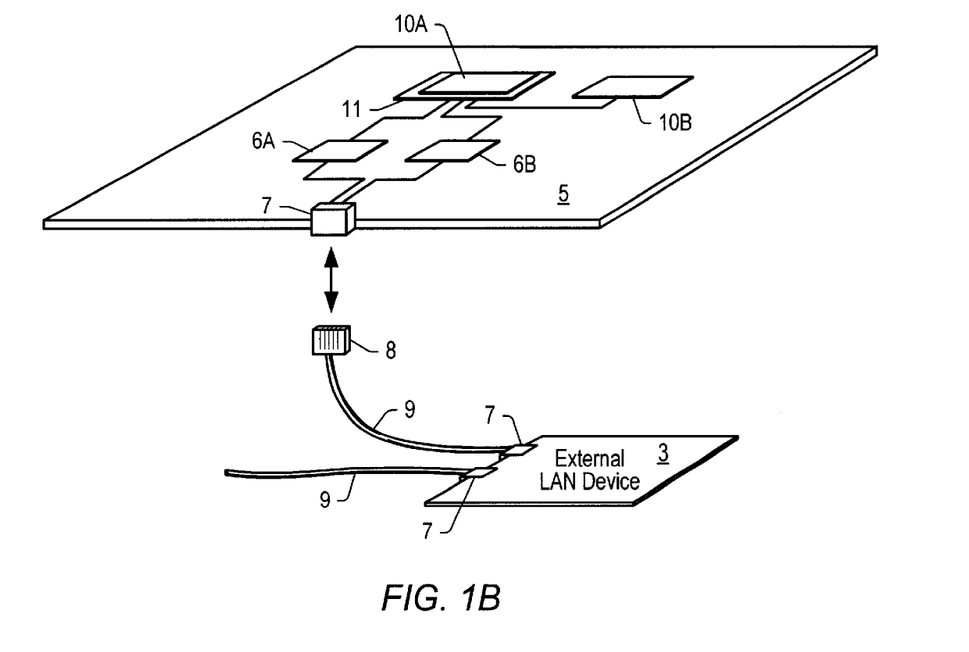
FIG. 1B illustrates an embodiment of a local area network (LAN) comprising internetworked modules on-chip, along with an external LAN device.

FIG. 1B—LAN Including On-Chip Modules and Off-Chip Device

Referring now to FIG. 1B, a plurality of computer chips 10 are shown coupled in a computer system in a LAN that includes an external, off-chip LAN device 3. Computer chip 10A is mounted on a printed circuit board 5 through a chip socket 11. Computer chip 10B is coupled to computer chip 10A through signal traces on the printed circuit board 5. Computer chip 10A is further coupled to a pair of analog devices 6A and 6B also mounted on the printed circuit board 5. The analog devices 6A and 6B are further coupled to a CAT5 socket 7 mounted at an edge of the printed circuit board 5. A CAT5 jack 8 is shown ready to connect to the CAT5 socket 7. Ethernet cable 9 is shown electrically connecting the CAT5 jack 8 to another CAT5 socket 7 at the external LAN device 3. The external LAN device 3 is further configured with a second CAT5 socket 7 for coupling to additional parts of the LAN.

As shown, the LAN includes one or more computer chips 10A and 10B as well as the external, off-chip LAN device. The analog devices 6A and 6B are configured to facilitate the on-chip to off-chip and back communications among the various LAN devices. Although Ethernet is shown in this embodiment, other LAN connections, hardware, and protocols may be used according to the present invention.

Figure 2:
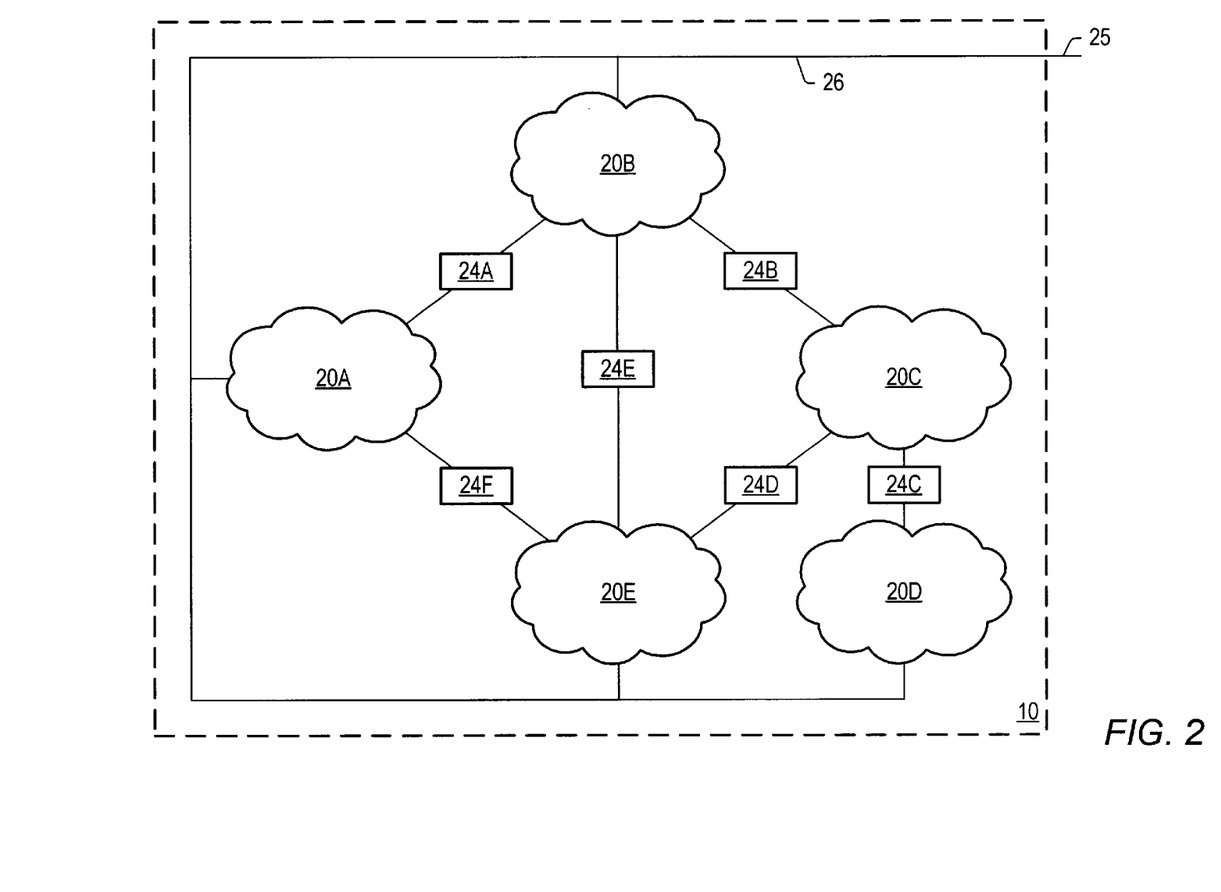
FIG. 2 illustrates one embodiment of a schematic representation of the internal configuration of an internetworked chip of FIG. 1.

FIG. 2—On-Chip LAN

The computer chip 10 is shown in a greater schematic detail in FIG. 2. A number of packet-switched local area networks or LANs, 20A through 20E, are shown interconnected, through a plurality of network interconnects, 24A through 24F. The term "network interconnect" may refer to a router, bridge, switch, gateway, or similar devices. When a reference is made to a component and its associated number, such as a LAN 20, that reference may refer to any of the components with that associated number, such as LANs 20A–20E, with or without an additional associated letter. The computer chip 10 includes more than one network interconnect because a configuration with just one network interconnect 24 would functionally be similar to a hub configuration. In reality, there may be numerous such LANs 20 on the computer chip 10, and hence more than one network interconnect may be necessary.

Network interconnects 24 play a key role in managing on-chip data traffic. Their job is to make sure that the data packets always arrive at the proper destination. When data is being transferred among modules that are on the same LAN 20, network interconnects 24 often are not needed, because the network 20 itself can handle its internal traffic. However, when the data is sent between two different networks, network interconnects 24 are more convenient. Network interconnects 24 examine data packets to find out what their destination is. Taking into account how busy various networks 20 are, a network interconnect 24A may send packets to another network interconnect 24B, one that may be closer to the packet's final destination. Usually, each network interconnect 24 connects to two of the local area networks 20, as shown in FIG. 2. When a data packet is sent between two networks 20, at least one network interconnect 24 will be needed to accomplish the transfer. For example, a data packet from network 20A to network 20B may travel either through the network interconnect 24A or may also travel through the network interconnects 24F and 24E, if network interconnect 24A is busy handling other data traffic.

FIG. 2 also shows the computer chip 10 having an on-chip local bus 26. The on-chip local bus 26 is also shown coupled to an external system bus 25, thereby connecting the computer chip 10 to other LAN devices 3 or other computer 10 chips (not shown). The local bus 26 may connect all of a selected set of on-chip packet-switched networks 20 to the external system bus 25. The network 20C is not directly connected to the external system bus 25, but may conveniently communicate with an external device 3 through a combination of network interconnects 24 and networks 20 as can be seen from the FIG. 2. The reasons behind not connecting a network directly to the external system bus 25 through the local bus 26 may include chip space limitations, relatively lower usage of the modules in that network 20, or that network's dependency on another network 20 during data transfer and function execution etc. The internal local bus 26 connection to various networks 20 is entirely a design choice. It is noted that the on-chip local bus 26 and the external LAN system bus 25 are preferably connected through an interface and drivers (not shown).

Figure 3:
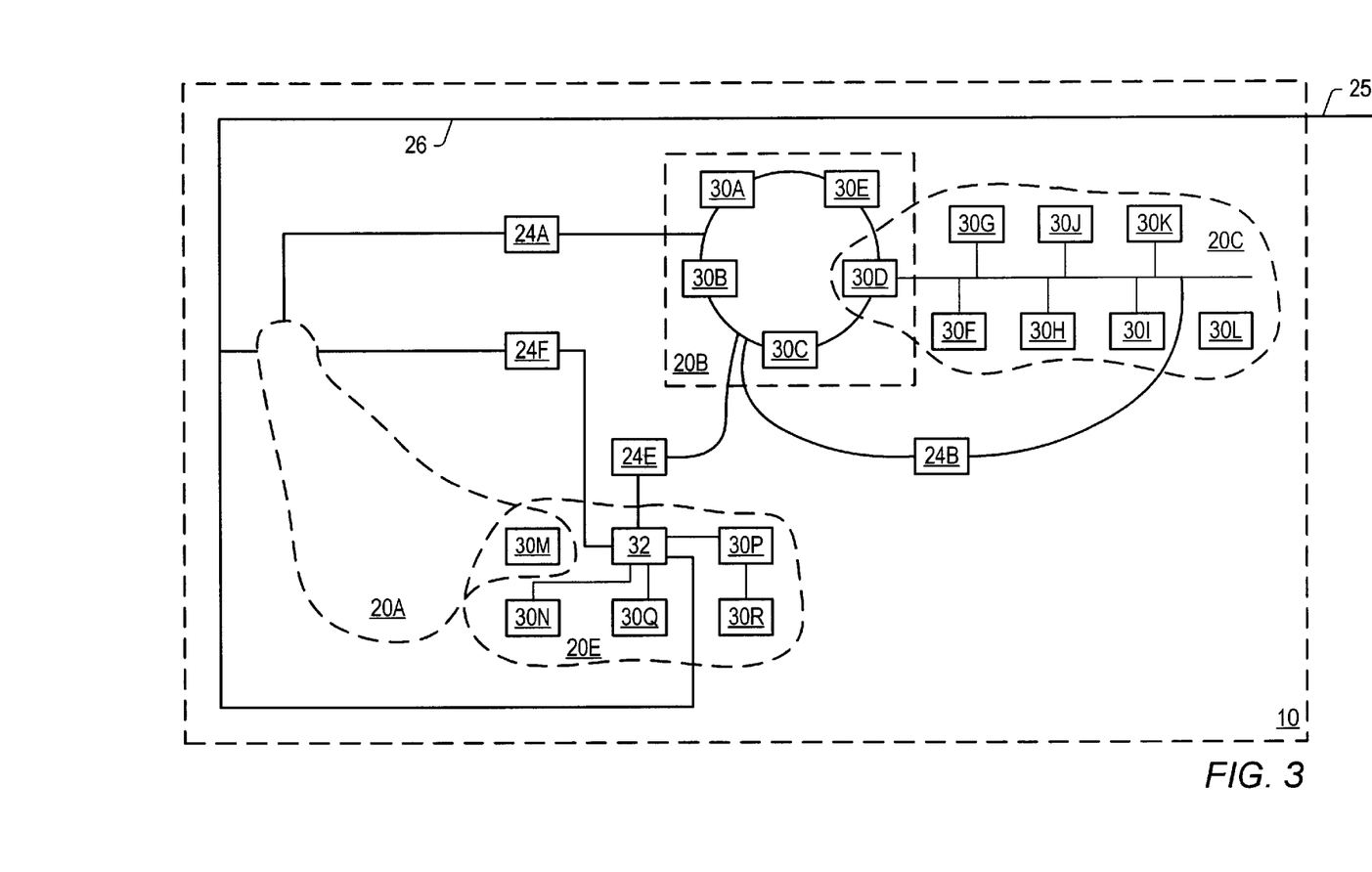
FIG. 3 shows an embodiment of an exemplary on-chip interconnection of modules with different network topologies.

FIG. 3—Module Interconnections Embodiments

Referring now to FIG. 3, an exemplary interconnection of modules 30A through 30R is shown. These modules 30A through 30R represent a subset of the total modules. Each network 20 comprises a number of such modules 30. All the modules 30 on the chip 10 are thus interconnected through various networks 20. The modules 30 preferably perform operations, and modules may be devices such as a processor, a memory, another storage device, an I/O device, an I/O controller, a task-specific hybrid (ASIC) of processing and storage functions, or a task-general hybrid of processing and storage functions. Each set of modules may be connected in different network configurations. For example, modules 30A through 30E are shown connected in a token-ring LAN 20B having a ring configuration, modules 30D and 30F–30L are shown connected in an Ethernet-type topology 20C, and modules 30M,30N,30P,30Q and 30R are shown connected in a LAN 20E with a hub 32. Network 20A may have star-shaped token-ring (not shown) or switched Ethernet or an FDDI (Fiber Distributed Data Interface) LAN or any other serial or parallel network configuration. The choice of a specific network configuration depends on the designer and factors such as network functionality, network usage, ease of network monitoring, network accessibility etc. may need be evaluated prior to selecting a specific network topology.

The present invention allows "system on a chip" producers to integrate module designs from different sources or module core vendors. This promotes integration of "best of the breed" cores from an evolving industry of "virtual component" suppliers. FIG. 3 also indicates the possibility of shared modules 30. Module 30D is shown connected to two LANs—20C and 20B; whereas module 30M is shown shared by two other networks, namely networks 20E and 20A. The network addressing scheme, for example, the TCP/IP or the modified TCP/IP addressing scheme, under the present invention, may result in these multiply-connected modules 30 (similar to the "multi-homed hosts" in Internet jargon) having more than one assigned addresses. One or more of such multiply connected modules 30 may function as a network interconnect 24 if its routing table is assigned correct values for routes.

Each module 30 is configured to convert a block of data into a number of data packets having a pre-determined or a variable packet-size. The data packets are prepared according to a network protocol that includes, for example, the TCP/IP protocol, a modified TCP/IP protocol using ICMAs, the IPX (Internet Packet Exchange) protocol, the AFP (AppleTalk Filing Protocol) protocol, the MNP (MICROCOM Networking Protocol) protocol, the Net BEUI (NetBIOS Extended User Interface) protocol, an SNMP (Simple Network Management Protocol) protocol or any other Connection-Oriented Network Protocol (CONP) or Connectionless Network Protocol (CLNP). It is understood that given the size and number of modules 30 on the computer chip 10, it may not be desirable or practicable to physically interconnect all modules 30 with one another. Data packets may include any of various fields, including instruction fields. Various module clusters may be formed through the local area networks 20 based on, among other things, the functions to be performed by the specific LAN. For example, one such LAN 20 may perform a dedicated mathematics operation, whereas another such LAN 20 may perform a data compression function, and still another LAN 20 may be dedicated for video image processing etc. Choice of number of LANs, number and type of modules per LAN, coupling of a LAN 20 to the local bus 26 etc. are issues generally decided by the chip designer. Further, addressing a particular LAN and a particular module within that LAN may be accomplished using a network addressing scheme corresponding to the network protocol selected for on-chip data communication. An exemplary network addressing is described later with reference to FIG. 4, but other forms of network addresses may be conveniently designed by one skilled in the art, based on this disclosure.

When all the modules 30 are interconnected through numerous on-chip networks 20, an efficient data communication scheme is desirable. Further, when different networks 20—either individually or in a specified group—perform a predetermined sequence of operations, it is also desirable to maximize the throughput by achieving as much functional parallelism as possible in a given chip architecture. The familiar Internet topology may be conveniently employed to transfer data between two local area networks 20 on the computer chip 10. To have a viable on-chip internetworking, packet-switching may be preferred. The familiar TCP (Transmission Control Protocol)/IP(Internet Protocol) for the Internet is designed to provide a universal interconnection among machines independent of the particular networks 20 to which they attach. The Internet may be viewed as a single, virtual network 20 to which all machines (or hosts) connect despite their physical connections. The TCP/IP protocols treat all networks equally. A local area network 20 like an Ethernet, or a token-ring network, or a point-to-point link between two hosts each count as one network. The TCP breaks down and later reassembles data packets, while IP is responsible for making sure that the packets are sent to the right destination. Without going into much detail regarding the Internet, it is suffice to state that a scheme similar to the TCP/IP protocol may be implemented to facilitate an on-chip data transfer for the internetworked chip 10.

IP addressing allows flexible routing because it is not based on an individual machine, but on a connection to a network. One advantage of the IP addressing scheme is that the same form of address can be used to refer to hosts, networks, and all hosts on a network (e.g. during a broadcast). But, when a host is connected to multiple networks, then that host would have multiple IP addresses. In such a case, knowing one address may not be sufficient to reach the host when some network(s) are unavailable. This problem can be remedied here because of the on-chip fabrication of all the networks 20. Additionally, customized routing algorithms may be easily implemented on-chip in case of a damaged or missing physical link between a multiply-connected module, e.g. module 30D or 30M, and one or more of the networks 20 to which that module is connected.

Additional discussion of TCP/IP protocol is omitted for the sake of brevity, but it is to be understood that various aspects of TCP/IP addressing—e.g. mapping of Internet addresses to physical host addresses, determination of an Internet address at startup, error detection and control mechanisms, protocol layering etc.—may be conveniently implemented using the modified TCP/IP addressing of the present invention.

Figure 4:
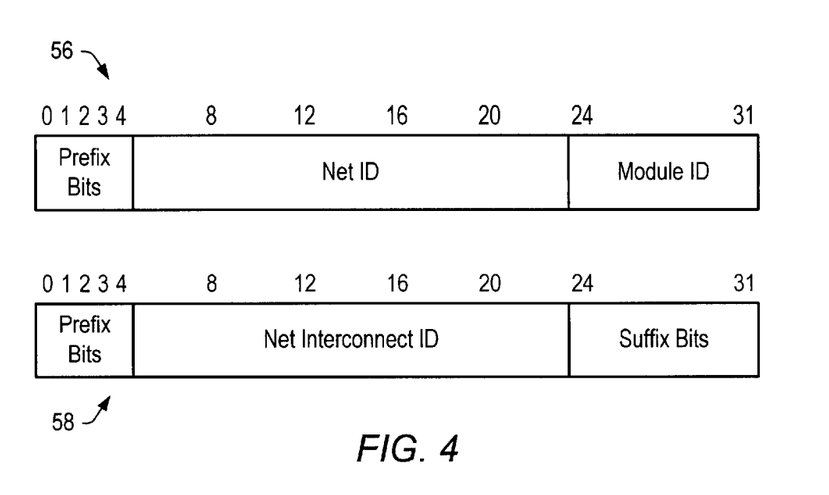
FIG. 4 shows an exemplary set of internetworked-chip module addresses (ICMAs) for a module and a network interconnect included in the chip of FIG. 1.

FIG. 4—ICMP Addressing Embodiment

Referring now to FIG. 4, two internetworked-chip module addresses or ICMAs are shown as examples of network addresses that can be selected to accomplish on-chip and off-chip data transfers. An ICMA for a module 30 comprises a plurality of network identifier bits—shown as the Net ID field in the address 56—to identify the network 20 to which that specific module 30 is connected, and also to enable a network interconnect 24 to configure the destination path for a data packet based on the identity of the receiving LAN. Additionally, the ICMA 56 for a module 30 also includes a number of bits—shown as the Module ID field—to enable the network 20 specified by the Net ID field in the ICMA 56 to identify that specific module 30 when a data packet arrives at that network. With one or more prefix bits, the ICMA 56 may indicate the size of the LAN 20 identified by the Net ID field, or may follow an addressing scheme similar to IP addressing. A protocol for such internetworked chips may be derived from the existing TCP/IP protocol. The addressing scheme here is considered a modified TCP/IP protocol partly because of a lack of any international classification for the new ICMAs, and partly because of analogizing the module with a "host" in the Internet and using the ICMA address 56 or 58 in a way similar to an IP address in the Internet environment. The exemplary ICMAs shown here may be conveniently modified to be applicable to a chip configuration having a very high density of on-chip modules and/or interconnected LANs.

A similar ICMA 58 may be assigned to the network interconnect 24. A different ICMA set may be desirable for network interconnects because a computer system may have more than one such internetworked chip 10, and also because of the need for the computer chip 10 to have capability to communicate with external off-chip devices through proper identification and addressing. The ICMA 58 for a network interconnect 24, hence, serves to identify the chip 10 itself in a multi-chip or multi-device computer system environment—by identifying the corresponding network interconnect 24 through the network interconnect ID field in the ICMA 58. Further, the ICMA 58 for a network interconnect 24 may also have one or more prefix bits to indicate, for example, the number of such internetworked chips 10 populating the computer system (not shown). Additionally, one or more suffix bits in the ICMA 58 may be provided to perform various functions, including error detection, communication verification, checksum resolution etc. The ICMAs 56, 58 are chosen to be of 32-bit length to conform to existing 32-bit system busses. Nevertheless, depending on the chip 10 configuration, they may carry less or more bits; and ICMA 56 for a module may have different bit-length from the ICMA 58 for the network interconnect. The network interconnect 24 may be configured, then, to adjust data packet length to the LAN bus width to maximize data transfer.

An internetworked-chip 10 manufacturer may, instead, use plain IP addresses, instead of the ICMAs, from the existing TCP/IP protocol for each module 30 and the network interconnect 24. In the IP addresses in FIG. 4A, the Host ID field would then identify a module 30 or a network interconnect 24 as the case may be. In that case, a central allocation authority similar to the Internet Society or a consortium of internetworked-chip manufacturers may allocate IP addresses. It is possible that different internetworked chips 10 in a computer system may have different IP addresses for their network interconnects, but may have same IP addresses for one or more modules 30 on the chip 10. All the discussion herein regarding the modified TCP/IP protocol for an internetworked-chip 10 may equally apply when an IP address, instead of an ICMA address, is chosen for data communication. Hence, in one embodiment, the internetworked-chip 10 would have IP addresses for modules 30 as well as the network interconnect 24. The on-chip and off-chip data communication would follow routine TCP/IP protocol, unless when an external electronic device does not recognize the TCP/IP protocol. In that case, a data block may be sent in a format recognized by the external device instead of the TCP/IP data packet as described later with regard to ICMA-based off-chip communication with or without the modified TCP/IP.

If an ICMA address scheme is chosen, then it is similarly possible that different internetworked chips 10 in a computer system may have different ICMAs 58 for their network interconnects 24, but may have similar ICMAs 56 for different modules 30 fabricated therein. This is because of the transparency inherent in this modified TCP/IP addressing scheme. One module 30 on a chip 10A does not have to know the ICMA 56 for another module 30 on a different chip 10B because all inter-chip communication is handled by the network interconnects 24. It is noted that one of the modules 30 in the computer chip 10 may be configured to include the network interconnects 24. In such a situation, a discrete network interconnects 24, as shown in FIGS. 2 and 3, may not be needed. Such a network interconnect-included module 30 may, then, have two ICMAs—one to identify the module 30 and the other to identify the network interconnect 24 included in the module 30.

Figure 5:
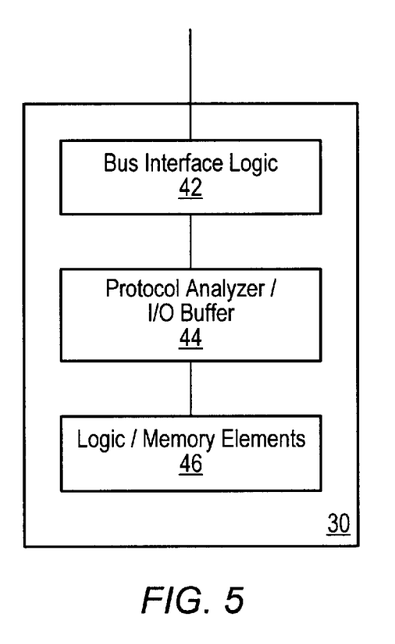
FIG. 5 illustrates an embodiment of a module.

Referring now to FIG. 5, a module 30 is shown. Each module 30 is preferably one of the group that includes processors, memories, I/O devices, I/O controllers or hybrids. A processor may be a CPU or a FPU in any of the variety of possible forms. A memory may be a RAM, ROM, hybrid memory or active memory in any of the variety of possible forms. Hybrids, including processing and storage elements/devices, may be task-specific, like an ASIC, or task-general. Each module 30 preferably includes a bus interface logic (BIL) 42, a protocol analyzer and I/O buffer 44, and various logic/memory elements 46 coupled to one another, as shown in FIG. 5. The protocol analyzer unit 44 may convert a data block into a number of data packets, or a plurality of data blocks into a single data packet, according to the modified TCP/IP protocol using ICMA addresses for the sender as well as the receiver modules. The I/O buffer 44 and the bus interface unit 42 provide the necessary communication link with other modules as well as with the network interconnect 24 through the local bus 26.

A module 30 may serve as a network interconnect 24 when that module's routing table is assigned values for available routes. In such an embodiment, one or more of the discrete network interconnects 24 (FIGS. 2 and 3) may not be required. When a module 30 is not provided with its ICMA upon manufacture or when a module 30 is introduced into a new network 20, the module 30 may be configured, in a way similar to the TCP/IP Internet, to employ limited broadcast addressing or local network broadcast addressing as part of its start up procedure before it learns its ICMA address or the ICMA address for the LAN 20 it is connected to. Additional ICMA addresses for other modules to which a given module is designed to interact may be stored in the memory unit 46. In that case, one or more modules operate as a "DNS server" with a built-in ICMA dictionary for different modules on the chip. In yet another embodiment, the hub 32 (FIG. 3) may be configured to function as a "server" and each module in that network, e.g. network 20E, may resort to a dynamic network address protocol that is similar to, for example, an RARP (Reverse Address Resolution Protocol) protocol or a DHCP (Dynamic Host Configuration Protocol) Protocol or a BOOTP (Bootstrap Protocol) in a TCP/IP environment to obtain its ICMA address from the "server" 32.

Figure 6:
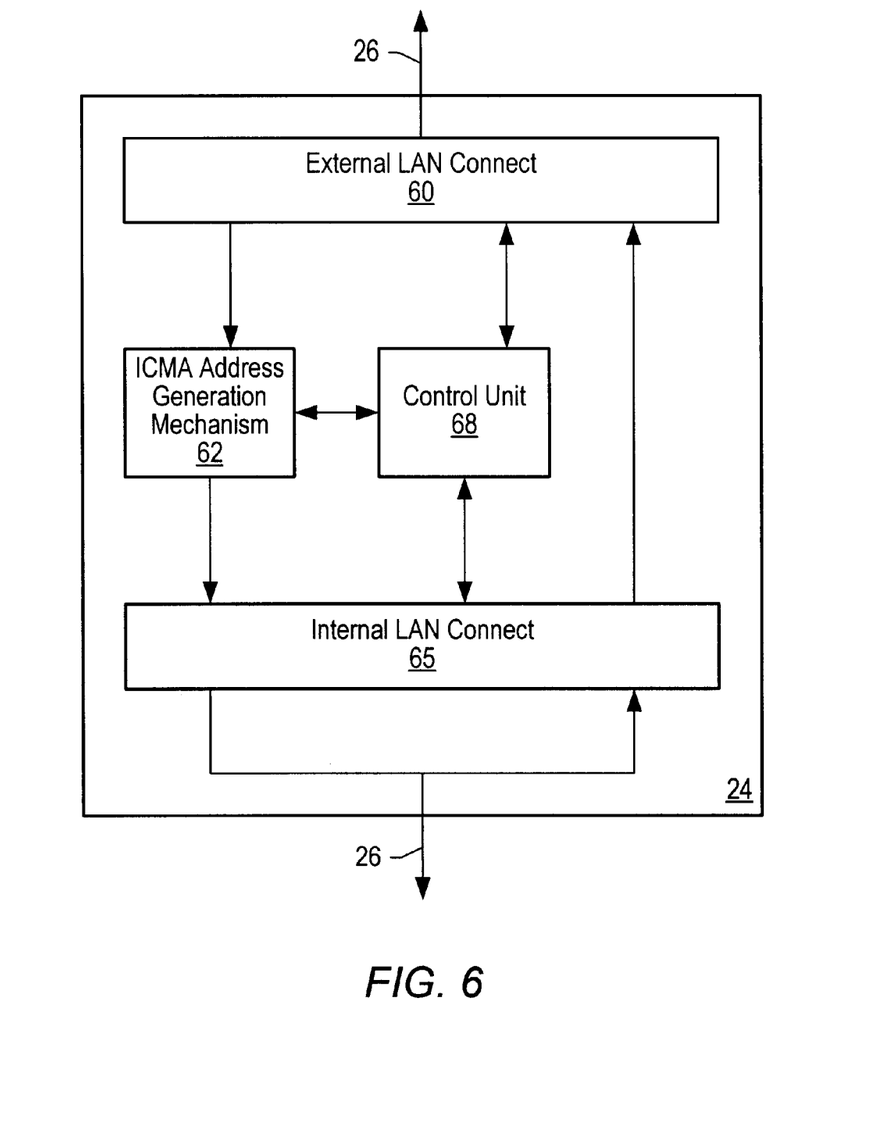
FIG. 6 depicts an embodiment of a network interconnect.

In one embodiment, the network interconnect 24 is configured to facilitate data communication between two or more networks 20 when, for example, it receives a misaddressed or misdirected data packet from one of the networks. Referring now to FIG. 6, an embodiment of a network interconnects 24 is shown. The network interconnect 24 is coupled to the on-chip local bus 26 (or alternatively the external system bus 25) through an external LAN connect 60 (bus interface logic and data distribution logic). As previously mentioned, the network interconnect 24 facilitates data communication between the computer chip 10A and a similar computer chip 10B or another device 3 in the computer system including the internetworked chip 10A. In one embodiment, during a typical inter-device data communication through the external system bus 25, the external LAN connect 60 may receive the data communication from the external device 3; and based on the form of the received data—i.e., for example, with or without destination ICMA—either the external LAN connect 60 or the network address generation mechanism 62, here, ICMA address generation mechanism 62, may generate an appropriate ICMA for the module 30 the data is addressed to or, in the absence of such an information, an ICMA address for the network 20 that is most capable and currently free to handle the received data. The control unit 68 may be configured to detect whether the received data confirms to the modified TCP/IP protocol because one or more external system devices may not implement the modified TCP/IP protocol with ICMAs.

The received data may not be in the form of modified TCP/IP data packets. In such a case, the control unit may be configured to encapsulate the received data into appropriate data packets and instruct either the external LAN connect 60 or the ICMA address generation mechanism 62 to supply the appropriate destination ICMA to the converted data packet prior to sending the data packet to an internal LAN connect 65. The internal LAN connect 65, in turn, forwards the destination ICMA-included data packet to the appropriate module 30 or LAN 20 through the local bus 26.

When a module 30 wishes to communicate with an external internetworked-chip or an electronic device in the computer system, the module 30, through its LAN 20, would transmit one or more data packets with the ICMA, if known, for the network interconnect 24 in the external internetworked-chip, and also with the module or network ICMA for a specific module or network in that external chip, if known; or with the ICMA 58 for the network interconnect 24 in the present computer chip 10 when no other information is available. Each data packet, in this situation, would preferably be transferred to the local bus 26 instead of being transmitted through one or more on-chip network interconnect 24, unless the LAN 20 itself is not directly connected to the local bus 26 as in the case of the network 20C in FIG. 2. Further, the transmitting module here may or may not be the same as the one that earlier received the data from the external device.

Depending on the versatility of the modified TCP/IP protocol, the module 30 may or may not convert a block of data into data packets if the transmission is to a chip or device that does not recognize the ICMA-based TCP/IP addressing. Further, the control unit 68 may be configured to convert the received data stream or data block into appropriate data packets using ICMA for the port controller in the external internetworked computer chip (not shown). Various ICMAs for the external port controllers (not shown) may either be stored in the external LAN connect 60 or may be obtained through the external system bus 25 by polling such external network interconnects 24. When there is more than one external unit that is qualified to receive the block of data, the external LAN connect 60 may be configured to monitor the external bus 25 for the availability of one or more of such units (not shown) and report the information to the control unit 68. The control unit 68, then, in turn, may decide whether to generate data packets with the given device information or whether to transmit the complete block of data in a single transfer. This may, in turn, depend on whether the system architecture allows full packet-switching for inter-device communication or limited packet-switching covering a subset of interconnected devices. Thus, two identical internetworked chips may or may not have a full ICMA-based TCP/IP data transfer.

The internal LAN connect 65 in the network interconnect 24 is coupled to the local bus 26 to receive the data from one or more of the sender networks 20 and forward that data to the external LAN connect 60. The control unit 68 may be configured to detect whether the received data is to be sent to an external device in the computer system. In the alternative, the control unit 68 may also detect whether that data was actually intended to be sent to a network 20, but was not sent due to lack of network ICMA or due to a router 24 or network failure. In such an eventuality, the control unit 68 would instruct the ICMA address generation mechanism 62 to generate the necessary ICMA based on the information transmitted by the sending network—including the ICMA for the sending network 20, which may be used to identify the receiving network from a network-mapping protocol. In one embodiment, the external LAN connect 60 may be configured to assign the ICMA to the network interconnect 24 either during start-up or when the internetworked-chip 10 is first interacts with another such chip in the computer system. Alternatively, the external LAN connect 60 may simply store the network interconnect 24 ICMA when assigned during chip fabrication.

In TCP/IP internet, a dynamic host configuration protocol (DHCP) provides flexible address allocation capabilities, and gives machines or hosts the ability to entertain responses from multiple servers. With DHCP, a server may be allowed to pull addresses from a pool and even assign them to various hosts in the network on a temporary basis. This is important when the number of available addresses is smaller than the number of hosts in a network, or in cases where the hosts change networks. DHCP provides automatic reconfiguration without system administration. Under the present scheme, the ICMA address generation mechanism 62 in the network interconnect 24 may be configured to serve as a "server" for the DHCP protocol and automatically generate an ICMA 56 for a module 30 newly fabricated on the chip 10 or when the chip 10 itself is introduced in a new computer system. DHCP may also be utilized in case where an existing module 30 is improved during fabrication, but without reallocating all pertinent ICMAs. The complete data flow among various units in the network interconnect 24 is shown in FIG. 6. The same configuration of FIG. 6 may be conveniently integrated into one of the modules 30. Various internetworked chips (not shown) in the computer system may themselves form a network, and the present modified TCP/IP protocol may further be extended to accomplish data communication in such a network.

Therefore, the present invention discloses an internetworked chip utilizing a TCP/IP or a modified TCP/IP protocol for on-chip, and, also preferably off-chip, data transfers. Here, the IP and ICMA-based addressing schemes are described with reference to these two protocols and as way of examples only. It is obvious to one skilled in the art that the exact addressing scheme may primarily depend on one or more network protocols implemented. As mentioned earlier, these network protocols may include, for example, the IPX (Internet Packet Exchange) protocol, the AFP (AppleTalk Filing Protocol) protocol, the MNP (Microcom Networking Protocol) protocol, the Net BEUI (NetBIOS Extended User Interface) protocol, an SNMP (Simple Network Management Protocol) protocol or any other Connection-Oriented Network Protocol (CONP) or Connectionless Network Protocol (CLNP). One skilled in the art would appreciate that the present internetworked-chip configuration functions as a local on-chip internet, and may be configured to implement other conventional internet elements such as DNS servers, WINS servers, backbones etc. The internetworking and packet-based data transfer allows for increased chip density and faster on-chip data transfer.

Although the computer chip of the present invention has been described in connection with the preferred embodiments, it is not intended to be limited to the specific form set forth herein, but on the contrary, it is intended to cover such alternatives, modifications and equivalents as can be reasonably included within the spirit and scope of the invention as defined by the appended claims.

I claim:

1. A method for transmitting a data block from a first module in a first LAN to a second module in a second LAN, comprising:

converting said data block, by said first module, into at least one data packet using a first networking protocol, wherein said first networking protocol utilizes a first networking address assigned to said first module and a second networking address assigned to said second module, wherein said first LAN and said second LAN are included in a plurality of packet-switched LANs comprised on a computer chip connecting a plurality of modules comprised on said computer chip, wherein said first module of said plurality of modules in said first LAN of said plurality of LANs is assigned said first networking address, and wherein said second module of said plurality of modules in said second LAN of said plurality of LANs is assigned a second networking address, wherein the plurality of LANs are interconnected by at least one network interconnect;

transmitting said at least one data packet, by said first LAN, along with said first networking address and said second networking address to said second LAN using said at least one network interconnect;

transmitting said at least one data packet, by said second LAN, to said second module using said second networking address;

converting said at least one data packet, by said second module, into said data block using said first networking protocol.

2. The method of claim 1, wherein said first networking protocol includes TCP/IP, wherein said first networking address is a first IP address, and wherein said second networking address is a second IP address.

3. The method of claim 1, wherein said first networking protocol includes TCP/IP modified to use ICMA, wherein said first networking address is a first ICMA address, and wherein said second networking address is a second ICMA address.

4. The method of claim 3, wherein said second ICMA address includes:

a plurality of network identifier bits to identify said second LAN; and one or more module identifier bits to identify said second module in said second LAN.

5. The method according to claim 4, wherein said first LAN transmitting said at least one data packet along with said first network address and said second network address to said second LAN using said at least one network interconnect includes:

said at least one network interconnect identifying said second LAN from said plurality of network identifier bits contained in said second ICMA address.

6. The method as in claim 4, wherein said second LAN transmitting said at least one data packet to said second module using said second network address includes:

said second LAN identifies said second module from said plurality of module identifier bits contained in said second IP address.

7. A method for configuring a plurality of computer chips into one or more LANs, comprising:

assigning a network address from a first plurality of network addresses to one or more modules in a first one of said plurality of computer chips, wherein each computer chip of said plurality of computer chips comprises one or more packet-switched LANs comprised on each computer chip connecting a plurality of modules comprised on said each computer chip;

assigning a network address from said first plurality of network addresses to one or more modules in a second one of said plurality of computer chips;

coupling said one or more modules on said first one of said plurality of computer chips to a first network interconnect on said first computer chip;

coupling said one or more modules on said second one of said plurality of computer chips to a second network interconnect on said second computer chip;

assigning a network address from a second plurality of network addresses to said first network interconnect on said first computer chip; and assigning a network address from said second plurality of network addresses to said second network interconnect on said second computer chip.

8. A method for transmitting a data block from a first module on a first computer chip of a plurality of computer chips to a second module on a second computer chip of said plurality of computer chips, comprising:

converting a data block addressed to a second module into at least one data packet by a first module using a networking protocol, wherein said networking protocol incorporates a first network address for said first module and a second network address for said second module into said at least one data packet, wherein said first computer chip and said second computer chip are part of a plurality of computer chips, wherein each of said plurality of computer chips comprises one or more packet switched LANs connecting a plurality of modules comprised on said plurality of computer chips;

transmitting said at least one data packet to a first network interconnect by said first module;

receiving said at least one data packet by said first network interconnect;

retrieving said second network address from said at least one data packet by said first network interconnect;

transmitting said at least one data packet to a second network interconnect based on said second network address by said first network interconnect;

receiving said at least one data packet by said second network interconnect;

retrieving said second data address from said at least one data packet by said second network interconnect;

sending said at least one data packet to said second module based on said second network address by said second network interconnect;

receiving said at least one data packet by said second module; and converting said at least one data packet into said data block by said second module.

9. The method according to claim 8, wherein said first network address and said second network address are substantially identical.

10. A computer chip comprising:

a plurality of modules comprised on said computer chip, wherein each of said plurality of modules is assigned a corresponding network address from a first plurality of network addresses, wherein each of said plurality of modules is configured to convert a data block into at least one data packet using a network protocol;

two or more packet-switched local area networks (LANs) comprised on said computer chip, wherein each of said LANs includes an interconnected subset of said plurality of modules; and at least one network interconnect connecting said LANs thereby interconnecting all of said plurality of modules, wherein said at least one network interconnect connects to at least two of said LANs and said LANs are configured to communicate therebetween said at least one data packet using said at least one network interconnect and said network protocol.

11. The computer chip of claim 10, wherein one of said plurality of modules includes one of said at least one network interconnect.

12. The computer chip of claim 10, wherein at least one of said plurality of modules is connected to at least two of said plurality of LANs.

13. The computer chip of claim 10, wherein said each of said plurality of modules is configured to function as one of the following:

a memory;

a storage device;

a processor;

an I/O device;

an I/O controller;

a task-specific hybrid chosen from a group including said memory, storage device, said processor, said I/O device, and said I/O controller; and a task-general hybrid chosen from said group including said memory, storage device, said processor, said I/O device, and said I/O controller.

14. The computer chip according to claim 10, wherein said plurality of LANs includes at least one of the following:

an Ethernet LAN;

a token-ring LAN having a ring configuration;

a token-ring LAN having a star configuration;

a switched Ethernet LAN; and a Fiber Distributed Data Interface (FDDI) LAN.

15. The computer chip as in claim 10, wherein said network interconnect comprises:

a first LAN connect coupled to receive data packets from said first LAN;

a second LAN connect coupled to provide data packets from said first LAN to said second LAN;

a network address generation mechanism coupled to said LAN connect, wherein said network address generation mechanism is configured to generate network addresses from said first plurality of network addresses; and a control unit coupled to said first LAN connect, said second LAN connect, and said network address generation mechanism to facilitate data communications.

16. The computer chip of claim 15, wherein said control unit is configured to implement a dynamic network address assignment protocol to allow through said network address generation mechanism an automatic allocation of a corresponding network address from said first plurality of network addresses for at least one of said plurality of modules.

17. The computer chip as in claim 15, wherein said network address generation mechanism is an internetworked-chip module address (ICMA) generation mechanism, and wherein said corresponding network address from said first plurality of network addresses includes an internetworked-chip module address.

18. The computer chip according to claim 15, wherein said second LAN connect is configured to assign to said network interconnect a corresponding network address from a second plurality of network addresses to facilitate said data communications between said first LAN and an off-chip LAN.

19. The computer chip as in claim 18, wherein said corresponding network address from said second plurality of network addresses includes an internetworked-chip module address (ICMA), and wherein said ICMA comprises at least a plurality of network interconnect identifier bits to identify said network interconnect during said data communication between said first LAN and said off-chip LAN.

* * * * *